United States Patent [19]
Hind et al.

[11] Patent Number: 5,987,523
[45] Date of Patent: Nov. 16, 1999

[54] APPLET REDIRECTION FOR CONTROLLED ACCESS TO NON-ORGINATING HOSTS

[75] Inventors: John Raithel Hind; David Bruce Lindquist, both of Raleigh; Pratik Biharilal Nanavati, Cary; Yih-Shin Tan; Ajamu Akinwunmi Wesley, both of Raleigh, all of N.C.

[73] Assignee: International Business Machines Corporation, Armonk, N.Y.

[21] Appl. No.: 08/868,611

[22] Filed: Jun. 4, 1997

[51] Int. Cl.[6] .............................. G06F 9/06; G06F 13/14
[52] U.S. Cl. ......................... 709/245; 709/238; 709/227
[58] Field of Search ......................... 395/200.3, 200.33, 395/200.32, 200.57, 200.75, 200.79, 200.8, 186, 187.01; 709/200, 203, 202, 227, 245, 249, 250; 713/200, 201, 202

[56] References Cited

U.S. PATENT DOCUMENTS

| | | | |
|---|---|---|---|
| 5,642,515 | 6/1997 | Jones et al. | 395/727 |
| 5,701,451 | 12/1997 | Rogers et al. | 395/600 |
| 5,708,780 | 1/1998 | Levergood et al. | 395/200.12 |
| 5,751,971 | 5/1998 | Dobbins et al. | 395/200.68 |
| 5,761,421 | 6/1998 | Van Hoff et al. | 395/200.53 |
| 5,774,660 | 6/1998 | Brendel et al. | 395/200.31 |
| 5,781,550 | 7/1998 | Templin et al. | 370/401 |
| 5,796,952 | 8/1998 | Davis et al. | 395/200.54 |
| 5,815,664 | 9/1998 | Asano | 395/200.57 |
| 5,815,665 | 9/1998 | Teper et al. | 395/200.59 |
| 5,826,014 | 10/1998 | Coley et al. | 395/187.01 |
| 5,838,910 | 11/1998 | Domenikos et al. | 395/200.33 |
| 5,838,916 | 11/1998 | Domenikos et al. | 395/200.49 |

OTHER PUBLICATIONS

Lemay, Laura; "Teach Yourself Java in 21 days", ISBN:1–57521–030–4, Sams.net Publishing, Chapter 8, "Java Applet Basics", pp. 130–146, Dec. 1996.

Brown, Mark R.; "Using Netscape 2", ISBN:0–7897–0612–1, Que Corporation, Chapter 34, Sun's Java and the Netscape Browser, pp. 885–907, Dec. 1995.

*Primary Examiner*—Mark H. Rinehart
*Assistant Examiner*—Marc D Thompson
*Attorney, Agent, or Firm*—Jeanine S. Ray-Yarletts

[57] ABSTRACT

A method and apparatus for allowing dynamic applet access to servers from which the applet did not originate wherein an application on the originating server redirects communications between the applet and network resources.

25 Claims, 4 Drawing Sheets

APPLET REDIRECTION FOR CONTROLLED ACCESS TO NON-ORGINATING HOSTS

RELATED APPLICATIONS

Application Ser. No. 08/868,873 entitled Host Information Access via Distributed Programmed Objects filed on Jun. 4, 1997 and assigned to International Business Machines Corporation.

FIELD OF INVENTION

The present invention relates to a computer system, and to a method of operating such a computer system attached to a network, such that the computer system can access data and code over the network. It specifically relates to communication by applets with hosts from which they did not originate.

BACKGROUND OF THE INVENTION

In the past couple of years there has been an explosive growth in the Internet, and in particular of the World-wide Web (WWW or Web), which is one of the facilities provided on top of the Internet. The WWW comprises many pages or files of information, distributed across many different servers. Each page is identified by a Universal Resource Locator (URL). The URL denotes both the server machine, and the particular file or page on that machine. There may be many pages or URLs resident on a single server.

In order to use the WWW, a client runs a piece of software known as a Web browser, such as WebExplorer® (provided as part of the Operating System/2 (OS/2)® IBM Corporation), or the Navigator® program available from Netscape Communications Corporation. The client interacts with the browser to select a particular URL, which in turn causes the browser to send a request for that URL or page to the server identified in the URL. Typically the server responds to the request by retrieving the requested page, and transmitting the data for that page back to the requesting (The client server interaction is performed in accordance with the hypertext transfer protocol ("HTTP")). This page is then displayed to the user on the client screen. The client may also cause the server to launch an application, for example to search for WWW pages relating to particular topics. In some instances, servers may not be reachable due to security mechanisms such as firewalls which filter access to users allowing only privileged users to access the information. In these cases, proxy servers or proxy applications may be used to help administer such accesses. Proxy servers can be viewed as an entity which straddles protected and unprotected network areas and facilitates passing traffic between these areas based on the users involved and the privileges configured for those users. The network connections used are termed sockets which are simply where data-streams from the network are sent or received. Numbered ports on the server can be opened to listen to particular socket data-streams.

Most WWW pages are formatted in accordance with a language known as HTML (hypertext mark-up language). Thus a typical page includes text together with embedded formatting commands, referred to as tags, which can be used to control the font size, the font style (for example, whether italic or bold), how to lay-out the text, and other page options. A Web browser parses the HTML script in order to display the text in accordance with the specified format. In addition, an HTML page can also contain a reference, in terms of another URL, to a piece of multimedia data, for example, an image, a video segment, or an audio file. A Web browser responds to such a reference by retrieving and displaying or playing the data. Alternatively, such multimedia data may form its own WWW page, without any surrounding HTML text.

Most WWW pages also contain one or more references to other WWW pages, which need not be on the same server as the original page. Such references may generally be activated by the user selecting particular locations on the screen, typically by (double) clicking a mouse control button. These references or locations are known as hyperlinks, and are typically flagged by the browser in a particular manner (for example, any text associated with a hyperlink may be in a different color). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

As so far described, and broadly speaking as currently implemented, the WWW suffers from the disadvantage that pages downloaded from a server to a client are essentially passive, in other words, they do not contain code which is executed at the client machine. One implication of this is that the server cannot offload onto the client any of the processing associated with the interaction between the client and the server. Thus if the client is completing a form with their telephone number for example, then any formal checks such as to the number of digits in the telephone number must be performed at the server. This results firstly in a heavier processing burden at the server, and secondly in time-consuming extra communications between the server and client should there be any mistakes to correct. Moreover, the inability of the server to download code for execution at the client is a significant limitation on the type of applications that can be created to exploit the WWW.

Recent developments, based particularly on the Java "JAVA" is a trademark of Sun Microsystems, Inc.) technology from Sun Microsystems Inc., have sought to overcome the above difficulties. The Java technology comprises primarily (i) a new programming language, somewhat similar to C and C++, and (ii) a virtual machine. Essentially, programs written in the Java programming language can be compiled into byte code form, and then interpreted at runtime on the Java virtual machine executing on the client. The Java virtual machine converts the byte codes into instructions that can be executed by the underlying physical machine.

Programs written using Java can be downloaded over the WWW in the form of byte codes for execution on a Java virtual machine at the client. Such programs are known as "applets". The use of the Java technology for downloading code over the WWW has two major benefits. Firstly, an applet can be platform independent, if we assume that each client has a copy of the Java virtual (The virtual machine at the client's system is typically incorporated either into the operating system, or into the Web browser itself). In other words, there is no need for a server to have different versions of the code for downloading to clients according to their respective operating systems and machines. Therefore, only a single version of the relevant code needs to be written and maintained, which makes life much simpler for software developers. Secondly, because the applet executes on a virtual machine, rather than a physical machine, security is greatly improved. Thus, when downloading code over the network, there is always a risk that it will include some malicious code (accidentally or otherwise) that may damage data or programs stored at the client. The virtual machine however can monitor the operation of the applet, and so detect and prevent such malicious activity.

It will be noted that the concept of downloading software from a server to a client in the form of byte codes for execution on a virtual machine was also known independently of the Java technology, see for example U.S. Pat. No. 5,347,632.

In order to invoke a Java applet, a Web page of HTML text contains an <APPLET> tag, which identifies the URL containing the applet. A browser responds to this tag by retrieving and running the applet. Also defined is a <PARAM> tag, which is contained within a pair of corresponding <APPLET> and </APPLET> tags, and which can be used to specify parameters that are passed to the applet at run-time. (Note that the APPLET and PARAM tags are not formally incorporated into the HTML standard, but are nevertheless recognised by many Web browsers). Further information about the Java technology and applets can be found in "Teach Yourself Java in 21 Days" by Laura Lemay and Charles Perkins (Sams.net Publishing, Indianapolis, USA, 1996).

A significant restriction of such applets is that the standard Java model only allows the applets to talk to the servers they were downloaded from. This is referred to as the Java "sandbox" security restriction. It provides some security benefits but also severely restricts Java use for some applications. For example, this is undesirable for applets whose main purpose is connectivity where the goal is to accomplish communications with many other systems in the network (networking applets). Recent Java releases such as the Java Development Kit (JDK) version 1.1 provide a solution to this called trusted applets, but this solution does not work for all scenarios. First, it does not address users of prior JDK versions such as 1.02. Second, leading web browsers have yet to fully comply with JDK 1.1. Third, and most importantly, network administrators do not want their users to connect to any arbitrary host in their network. Instead they want the flexibility of multi-host applet communication with the advantage of administrative control and security capabilities. No solution is available which provides all of these advantages.

SUMMARY OF THE INVENTION

The present invention provides a method and apparatus allowing applets to communicate with multiple hosts by redirecting applet communications at the originating server with the capability to administer such redirection via filters and add-on administrative functions. This function is made possible by a server application (also referred to as a redirector) residing on the web server which also houses the subject applets. Although "Java" and the commonly Java-associated term "applet" are used in describing the present invention, such use is not intended to limit the invention to any particular programming or networking environment.

The present invention defines an application (redirector) installed on a web server which redirects communications for networking applets residing on the same server. When a networking applet is downloaded from the web server to establish a session to a different host, the applet code detects the web server name and opens a socket connection to the redirector's port number. The redirector acknowledges this connection and the networking applet can reply with a remote host server name and socket for the redirector to connect to. Once the redirector makes the requested host connection, the two connections form a communication pipe between the networking applet and the host with the redirector in the middle rerouting traffic. With such an approach there is no modification needed anywhere on the existing networking environment to allow networking applet functionality. In this manner, the networking applet is able to talk with a remote host and the web server administrator and through modifying the redirector's configuration, can control such applet redirection.

The present invention specifically defines an approach for administering such applet redirection. The redirector is configured with a host access filtering table. This table contains all administered host addresses and the user address ranges which will be allowed to access them. For example, if a networking applet is downloaded and requests a connection to Host A, the machine address where the applet is executing can be checked to see if it is in the allowable range for access to Host A. If not, the connection request is rejected and possibly logged for record-keeping of filter refusals. Examples discussed in the preferred embodiment section provide a more detailed look at this interaction.

The present invention also defines a method for static host connection that relieves any burden on networking applets to know and request certain host addresses. Instead, the filtering table mentioned above could also be used to route host connections by user address range. If the redirector were configured for this capability, a networking applet need only contact the redirector to be assigned a host connection. When contacted by a networking applet without a host-specific connection request, the redirector can look in the filter table to see what host should be connected by default for the applet's address range.

The present invention also defines a method for enhancing redirector functions through the use of add-on modules. With this approach, redirector function need not be reprogrammed or redistributed to web servers if added function is desired. Instead, an approach is defined for the redirector to interact with add-on modules and accomplish functions the redirector need not even be aware of. One such add-on which is discussed as an example in the preferred embodiment section is that of a security add-on that will encrypt and decrypt session data between the client and the server. With such function, networking applets gain the advantage of encrypted sessions without the necessity of modifying redirector function to accomplish such encryption.

DETAILED DESCRIPTION OF THE PREFERRED EMBODIMENT

The preferred embodiment of the present invention is implemented using Java programming classes and a Web client/server network environment. It involves user written client networking applets, target resources on the network and a redirector application residing on a Web server as defined by the present invention. The interactions in this framework are best understood using specific examples.

Figure 1:
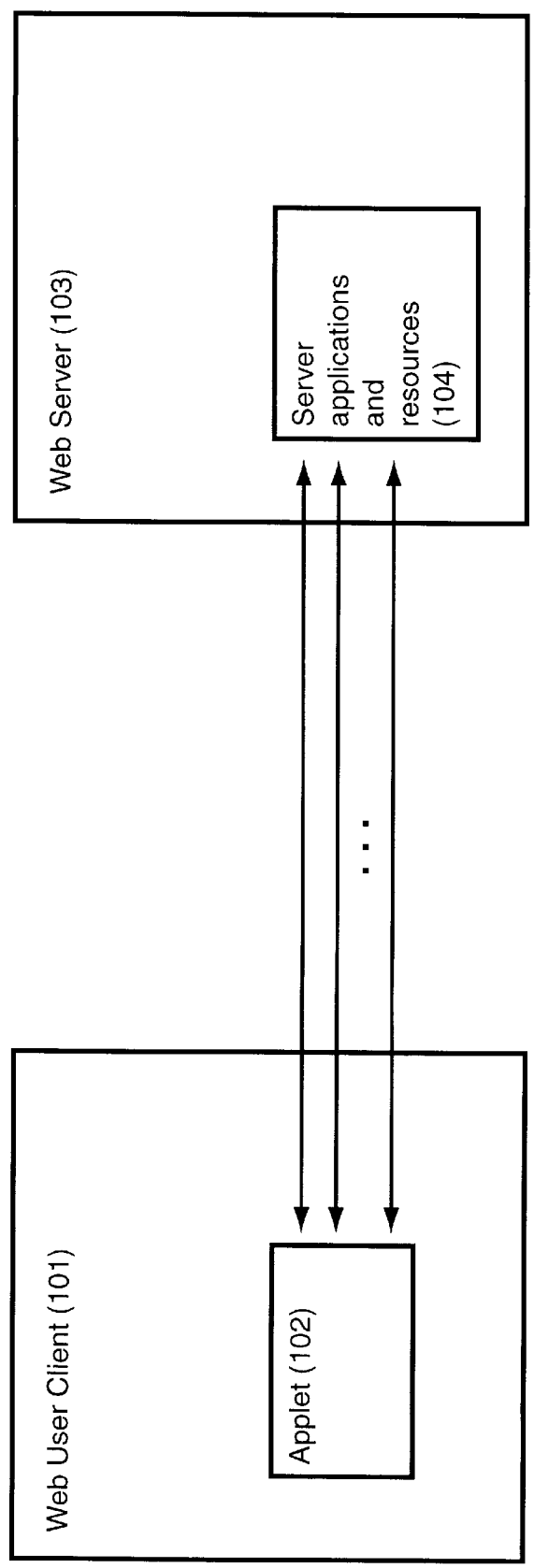
FIG. 1 depicts a basic network environment with sandbox restriction (Prior Art).

The example network shown in FIG. 1 represents networking applet capabilities with the present Java sandbox security restriction. Using a Web client (101) such as a Java-enabled web browser or Java applet viewer, a user runs applets (102) dynamically downloaded from a Web server (103). However, due to the sandbox restriction the applet can only communicate with that originating server (103). Applications and resources on the server (104) can be used by the applet to store information or help complete its tasks, but the applet is not allowed to access other servers that may be on the network. As previously mentioned, recent advancements in the Java standard define the framework for trusted applets that can access other resources, but this approach is not widely supported by today's browsers and, more importantly, it does not provide administrative control over what resources an applet can access.

Figure 2:
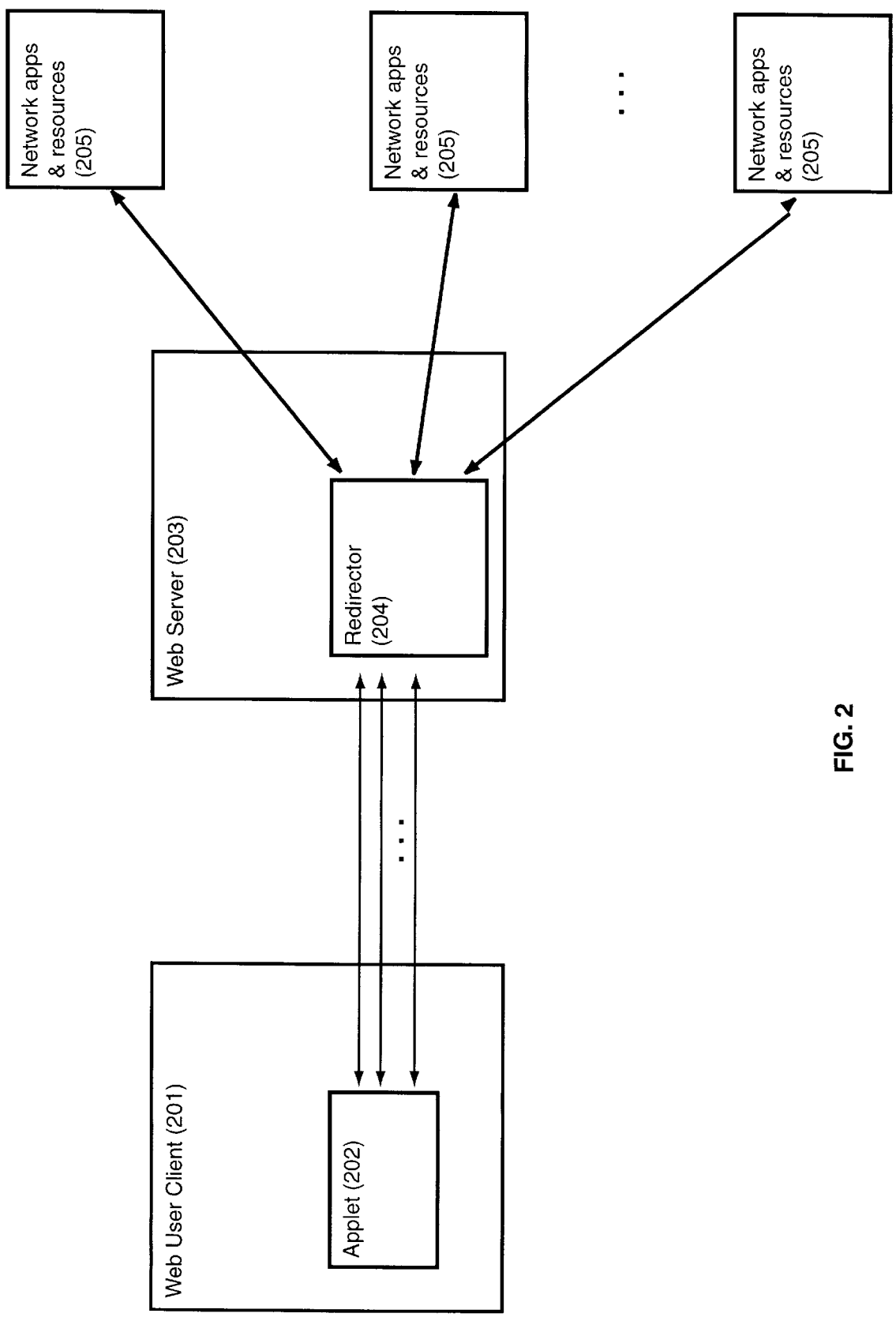
FIG. 2 depicts a network environment with the present invention enabling access to non-originating hosts.

The network shown in FIG. 2 represents the scope of access possible with the present invention and the administrative control provided for that access. Using a Java-enabled browser or applet viewer on a Web client (201) a user runs applets (202) dynamically downloaded from a Web server (203). Through the capabilities available in Java, the applet (202) can only directly access resources on the originating server (203) including the redirector proxy (204). However, from this interaction with the redirector (204), the applet (202) is also able to indirectly access applications and resources elsewhere on the network (205). After the redirector (204) is contacted by the applet (202), it contacts other network resources (205) on the applet's behalf and forwards information between the applet (202) and those resources (205). In this manner, the scope of communication available to applets (202) is expanded through the use of the present invention's redirector (204). This increased access is not provided unchecked, though, because the redirector's (204) central presence allows it to be used to manage access to other network resources. Detailed descriptions of how the external access is provided and administered are provided in FIGS. 3 and 4.

Figure 3:
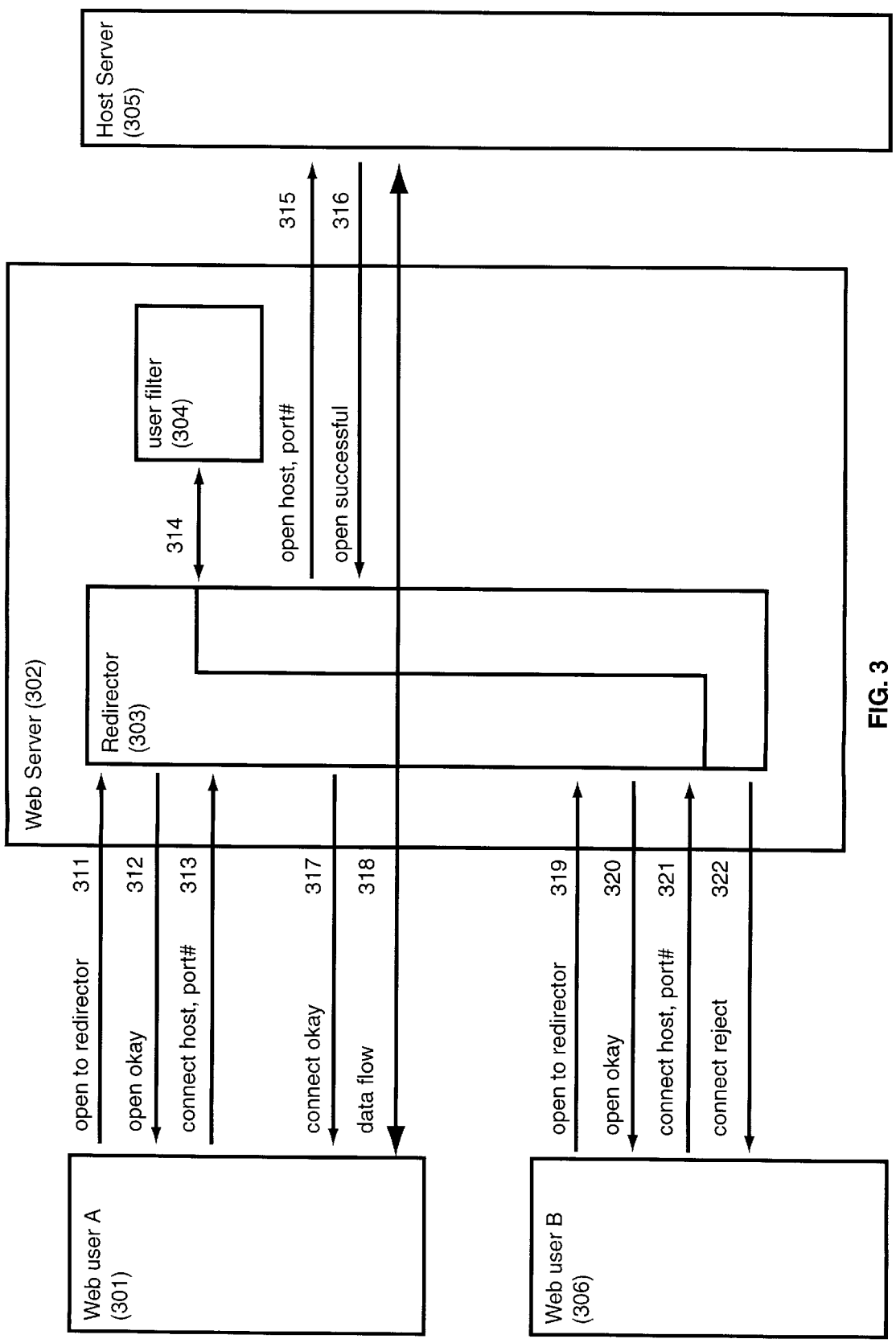
FIG. 3 depicts the flows between the applets, redirector and a host server when using the present invention for administered expanded access.

FIG. 3 shows users A and B on Web clients (301 & 306) that use the present invention's redirector (303) function to access a host server (305). For clarity, the figure flows begin after a Java applet has been downloaded to the Web clients (301 & 306) from the Web server (302). Communication begins with the applet requesting to open the redirector (303) via its port number (311) on the Web server (302). While the figure depicts the users (301 & 306) to be separate from the Web server (302), they may reside in the same computer. The redirector (303) recognizes the open request from the client (301) and accepts it (312). The client (301) then requests (313) to connect to a host server (305) which is different from the Web server (302). The redirector (303) checks a table of users and privileges to see if user A is allowed to contact the Host server (305) (314). In this scenario, assume user A is allowed to connect and the redirector opens a port to communicate with the host server (305) (315). The host server (305) responds successfully to this request (316) and the redirector (303) notifies the client that they can now communicate with the host server (305) (317). Note the Java sandbox restriction only allows direct connection to the Web server (302) and this further connection to the Host server (305) is only possible because of the present invention. From this point the client (301) can exchange information with the host server (305) at will with the redirector (303) acting as a go-between (318).

FIG. 3 also shows user B on a web client (306) which we can assume does not have the appropriate privileges. The client (306) opens the redirector port (319) and the redirector (303) responds with success (320). The client (306) then requests to connect to a remote host server (305) which it is not authorized to connect with (321). The redirector (303) checks his host access table and sees that user B does not have the necessary privileges for this connection (314). The redirector (303) then rejects the connection request informing the client (306) that access was denied (322). The host access table that allowed user A and denied user B can be modified at the server or remotely on a host by host basis or modified to dynamically redirect an existing host flow. With this filtering capability, administrators can give extended access to web clients while also maintaining control for security purposes.

Figure 4:
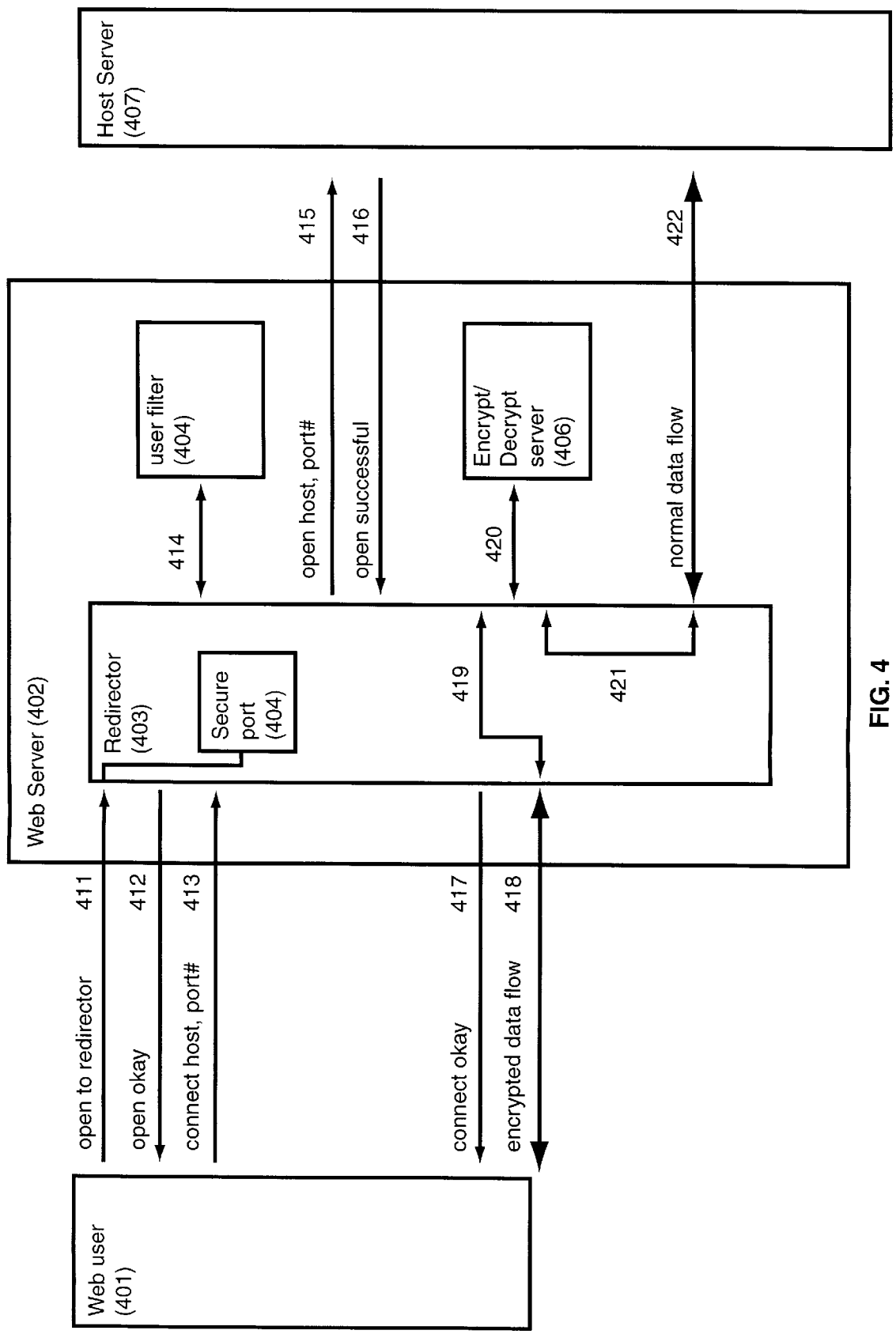
FIG. 4 depicts the flows involved to use add-on functions such as encryption with the present invention.

FIG. 4 presents an example flow that incorporates add-on functions as defined by the present invention. The particular add-on used in the preferred embodiment is one that allows encryption/decryption capabilities between clients and server. For clarity the figure flows begin after a Java applet has been downloaded to the Web client (401) from the Web server (402). Communication begins with the applet requesting to open the redirector (403) with a secure connection via its port number on the Web server (402) (411). Seeing that a secure connection was requested, the redirector (403) connects the client with its secure port function (404) and returns success (412). The client (401) then requests connection to a host server (407) (413) and the redirector (403) checks the user privileges in the host access table (405). Seeing that the user is is allowed access to this host server (407) the redirector (403) opens the host server port (415), receives successful confirmation (416), and notifies the client of connection success (417). Now that a secure connection is established, the client (401) sends encrypted data flows to the web server (402) (418). The secure port (404) function, knowing data flows will be encrypted, passes the data to an encryption/decryption add-on (406) (419). The encryption add-on can be any form of encryption supported by the system. The add-on decrypts the data and passes it back to the redirector (403) as a normal data flow (420). The redirector takes the data flow (421) and forwards it (422) to the host server (407). This same process reverses itself whenever the host (407) sends normal data back to the redirector and the redirector passes it off for encryption. In this manner, the applet gains the ability to have secure sessions without modification to server code or redirector code. This example presents a security add-on, but the concept of add-ons is not limited to any particular form of add-ons and can apply to any other function add-on that does not require management knowledge of the redirector.

What is claimed is:

1. A method for allowing a Java applet to access a server other than a first server from which said applet was downloaded, wherein said method operates to overcome a Java sandbox security restriction of said applet which prevents said applet from accessing said other server, said method comprising the steps of:

downloading a selected applet from said first server to a user workstation, said first server having a unique address;

detecting the address of said first server;

opening a first socket connection from said selected applet to a redirector function on said first server;

sending an address for a target host server from said selected applet to said redirector function;

opening a second socket connection from said redirector function to a host function on said target host server on behalf of said selected applet; and accessing said host function from said selected applet indirectly by redirecting data through said redirector function using said first socket connection and said second socket connection.

2. A method for enabling applets in a computer network to communicate with one or more remote servers for the purpose of accessing one or more target resources, wherein said target resources are accessible from said remote servers, and wherein said remote servers are different than a first server from which said applet was downloaded, said method comprising the steps of storing one or more applets on said first server, wherein said applets have an inherent prohibition against directly exchanging messages with any other server except said first server;

downloading a selected one of said applets onto a client machine;

executing said downloaded selected applet on said client machine;

executing a redirector function on said first server;

establishing a first connection between said selected applet and said redirector function;

sending a connect request from said applet to said redirector function, wherein said connect request specifies (i) a server host address of a selected one of said servers other than said first server and (ii) a port number on said selected server;

receiving, by said redirector function, said connect request;

checking a filter table, responsive to said receiving step, to determine if said client machine is authorized to access said selected server;

establishing, by said redirector function, a second connection between said redirector function and said selected server when said checking step has a positive result, said second connection being on behalf of said applet; and indirectly exchanging messages between said applet and said selected server using said redirector function to transfer said exchanged messages between said first connection and said second connection.

3. The method as claimed in claim 2, wherein said applets are Java applets, and wherein operation of a Java sandbox security restriction enforces said inherent prohibition.

4. The method as claimed in claim 2 or 3, wherein:

said filter table comprises a plurality of entries, each of said entries comprising: an address of a particular one of said servers other than said first server, and a range of client machine addresses which are authorized to access said particular one; and said checking step further comprises the steps of:

extracting a client address from said connect request;

locating a particular entry in said table, wherein said address in said particular entry matches said server host address from said connect request; and comparing said extracted client address to said range of addresses from said located entry.

5. The method as claimed in claim 2, further comprising:

executing an add-on function on said first server; and performing further processing of exchanged messages using said add-on function.

6. The method as claimed in claim 5, wherein said add-on function is a cryptography function for providing secure data transmission between said client machine and said first server, and wherein said performing further processing step further comprises the steps of receiving encrypted data from said applet by said redirector function over said first connection;

forwarding said encrypted data from said redirector function to said add-on function;

decrypting said encrypted data using said add-on function;

returning said decrypted data from said add-on function to said redirector function;

forwarding said decrypted data from said redirector function to said selected server over said second connection;

receiving unencrypted data from said selected server by said redirector function over said second connection;

forwarding said unencrypted data from said redirector function to said add-on function;

encrypting said unencrypted data using said add-on function;

returning said encrypted data from said add-on function to said redirector function; and forwarding said encrypted data from said redirector function to said applet.

7. A method for enabling applets in a computer network to communicate with one or more remote servers for the purpose of accessing one or more target resources, wherein said target resources are accessible from said remote servers, and wherein said remote servers are different than a first server from which said applet was downloaded, said method comprising the steps of:

storing one or more applets on said first server, wherein said applets have an inherent prohibition against directly exchanging messages with any other server except said first server;

downloading a selected one of said applets onto a client machine;

executing said downloaded selected applet on said client machine;

executing a redirector function on said first server;

establishing a first connection between said selected applet and said redirector function;

sending a connect request from said applet to said redirector function, wherein said connect request does not specify a server host address of a target server;

receiving, by said redirector function, said connect request;

checking a filter table, responsive to said receiving step, to determine a default target server to be used with said client machine;

establishing, by said redirector function, a second connection between said redirector function and said default target server on behalf of said applet; and indirectly exchanging messages between said applet and said default target server using said redirector function to transfer said exchanged messages between said first connection and said second connection.

8. The method as claimed in claim 7, wherein said applets are Java applets, and wherein operation of a Java sandbox security restriction enforces said inherent prohibition.

9. The method as claimed in claim 7 or 8, wherein:
said filter table comprises a plurality of entries, each of said entries comprising: an address of a particular one of said servers other than said first server, and a range of client machine addresses which are authorized to access said particular one; and
said checking step further comprises the steps of:
extracting a client address from said connect request; and
locating a particular entry in said table, wherein said address in said particular entry matches said extracted client address.

10. A system in a computer network for enabling applets to communicate with a different server than a first server from which said applet was downloaded, comprising:
one or more applets, each of said applets stored on a first server, wherein said applets have an inherent prohibition against directly exchanging messages with any other server except said first server;
one or more target resources, each of said target resources being accessible from a server other than said first server;
a client machine, onto which a selected one of said applets is downloaded;
means for executing said downloaded selected applet on said client machine;
means for executing a redirector function on said first server,
means for establishing a first connection between said selected applet and said redirector function;
means for sending a connect request from said applet to said redirector function, wherein said connect request specifies (i) a server host address of a selected one of said servers other than said first server and (ii) a port number on said selected server;
means for receiving, by said redirector function, said connect request;
means for checking a filter table, responsive to said means for receiving, to determine if said client machine is authorized to access said selected server;
means for establishing, by said redirector function, a second connection between said redirector function and said selected server when said means for checking has a positive result, said second connection being on behalf of said applet; and
means for indirectly exchanging messages between said applet and said selected server using said redirector function to transfer said exchanged messages between said first connection and said second connection.

11. The system as claimed in claim 10, wherein said applets are Java applets, and wherein operation of a Java sandbox security restriction enforces said inherent prohibition.

12. The system as claimed in claim 10 or 11, wherein:
said filter table comprises a plurality of entries, each of said entries comprising: an address of a particular one of said servers other than said first server, and a range of client machine addresses which are authorized to access said particular one; and
said means for checking further comprises:
means for extracting a client address from said connect request;
means for locating a particular entry in said table, wherein said address in said particular entry matches said server host address from said connect request; and
means for comparing said extracted client address to said range of addresses from said located entry.

13. The system as claimed in claim 10, further comprising:
means for executing an add-on function on said first server; and
means for performing further processing of exchanged messages using said add-on function.

14. The system as claimed in claim 13, wherein said add-on function is a cryptography function for providing secure data transmission between said client machine and said first server, and wherein said means for performing further processing further comprises:
means for receiving encrypted data from said applet by said redirector function over said first connection;
means for forwarding said encrypted data from said redirector function to said add-on function;
means for decrypting said encrypted data using said add-on function;
means for returning said decrypted data from said add-on function to said redirector function;
means for forwarding said decrypted data from said redirector function to said selected server over said second connection;
means for receiving unencrypted data from said selected server by said redirector function over said second connection;
means for forwarding said unencrypted data from said redirector function to said add-on function;
means for encrypting said unencrypted data using said add-on function;
means for returning said encrypted data from said add-on function to said redirector function; and
means for forwarding said encrypted data from said redirector function to said applet.

15. A system in a computer network for enabling applets to communicate with a different server than a first server from which said applet was downloaded, comprising:
one or more applets, each of said applets stored on a first server, wherein said applets have an inherent prohibition against directly exchanging messages with any other server except said first server;
one or more target resources, each of said target resources being accessible from a server other than said first server;
a client machine, onto which a selected one of said applets is downloaded;
means for executing said downloaded selected applet on said client machine;
means for executing a redirector function on said first server;
means for establishing a first connection between said selected applet and said redirector function;
means for sending a connect request from said applet to said redirector function, wherein said connect request does not specify a server host address of a target server;
means for receiving, by said redirector function, said connect request;
means for checking a filter table, responsive to said means for receiving, to determine a default target server to be used with said client machine;
means for establishing, by said redirector function, a second connection between said redirector function and said default target server on behalf of said applet; and means for indirectly exchanging messages between said applet and said default target server using said redirector function to transfer said exchanged messages between said first connection and said second connection.

16. The system as claimed in claim 15, wherein said applets are Java applets, and wherein operation of a Java sandbox security restriction enforces said inherent prohibition.

17. The system as claimed in claim 15 or 16, wherein:
said filter table comprises a plurality of entries, each of said entries comprising: an address of a particular one of said servers other than said first server, and a range of client machine addresses which are authorized to access said particular one; and
said means for checking further comprises:
 means for extracting a client address from said connect request; and
 means for locating a particular entry in said table, wherein said address in said particular entry matches said extracted client address.

18. A computer program product on a computer-readable medium in a computer network for enabling applets to communicate with a different server than a first server from which said applet was downloaded, comprising:
one or more applets, each of said applets stored on a first server, wherein said applets have an inherent prohibition against directly exchanging messages with any other server except said first server;
one or more target resources, each of said target resources being accessible from a server other than said first server;
a client machine, onto which a selected one of said applets is downloaded;
computer-readable program code means for executing said downloaded selected applet on said client machine;
computer-readable program code means for executing a redirector function on said first server;
computer-readable program code means for establishing a first connection between said selected applet and said redirector function;
computer-readable program code means for sending a connect request from said applet to said redirector function, wherein said connect request specifies (i) a server host address of a selected one of said servers other than said first server and (ii) a port number on said selected server;
computer-readable program code means for receiving, by said redirector function, said connect request;
computer-readable program code means for checking a filter table, responsive to said computer-readable program code means for receiving, to determine if said client machine is authorized to access said selected server;
computer-readable program code means for establishing, by said redirector function, a second connection between said redirector function and said selected server when said computer-readable program code means for checking has a positive result, said second connection being on behalf of said applet; and
computer-readable program code means for indirectly exchanging messages between said applet and said selected server using said redirector function to transfer said exchanged messages between said first connection and said second connection.

19. The computer program product as claimed in claim 18, wherein said applets are Java applets, and wherein operation of a Java sandbox security restriction enforces said inherent prohibition.

20. The computer program product as claimed in claim 19 or 18, wherein:
said filter table comprises a plurality of entries, each of said entries comprising: an address of a particular one of said servers other than said first server, and a range of client machine addresses which are authorized to access said particular one; and
said computer-readable program code means for checking further comprises:
 computer-readable program code means for extracting a client address from said connect request;
 computer-readable program code means for locating a particular entry in said table, wherein said address in said particular entry matches said server host address from said connect request; and
 computer-readable program code means for comparing said extracted client address to said range of addresses from said located entry.

21. The computer program product as claimed in claim 18, further comprising:
computer-readable program code means for executing an add-on function on said first server; and
computer-readable program code means for performing further processing of exchanged messages using said add-on function.

22. The computer program product as claimed in claim 21, wherein said add-on function is a cryptography function for providing secure data transmission between said client machine and said first server, and wherein said computer-readable program code means for performing further processing further comprises:
computer-readable program code means for receiving encrypted data from said applet by said redirector function over said first connection;
computer-readable program code means for forwarding said encrypted data from said redirector function to said add-on function;
computer-readable program code means for decrypting said encrypted data using said add-on function;
computer-readable program code means for returning said decrypted data from said add-on function to said redirector function;
computer-readable program code means for forwarding said decrypted data from said redirector function to said selected server over said second connection;
computer-readable program code means for receiving unencrypted data from said selected server by said redirector function over said second connection;
computer-readable program code means for forwarding said unencrypted data from said redirector function to said add-on function;
computer-readable program code means for encrypting said unencrypted data using said add-on function;
computer-readable program code means for returning said encrypted data from said add-on function to said redirector function; and
computer-readable program code means for forwarding said encrypted data from said redirector function to said applet.

23. A computer program product on a computer-readable medium in a computer network for enabling applets to communicate with a different server than a first server from which said applet was downloaded, comprising:

one or more applets, each of said applets stored on a first server, wherein said applets have an inherent prohibition against directly exchanging messages with any other server except said first server;

one or more target resources, each of said target resources being accessible from a server other than said first server;

a client machine, onto which a selected one of said applets is downloaded;

computer-readable program code means for executing said downloaded selected applet on said client machine;

computer-readable program code means for executing a redirector function on said first server;

computer-readable program code means for establishing a first connection between said selected applet and said redirector function;

computer-readable program code means for sending a connect request from said applet to said redirector function, wherein said connect request does not specify a server host address of a target server;

computer-readable program code means for receiving, by said redirector function, said connect request;

computer-readable program code means for checking a filter table, responsive to said computer-readable program code means for receiving, to determine a default target server to be used with said client machine;

computer-readable program code means for establishing, by said redirector function, a second connection between said redirector function and said default target server on behalf of said applet; and computer-readable program code means for indirectly exchanging messages between said applet and said default target server using said redirector function to transfer said exchanged messages between said first connection and said second connection.

24. The computer program product as claimed in claim 23, wherein said applets are Java applets, and wherein operation of a Java sandbox security restriction enforces said inherent prohibition.

25. The computer program product as claimed in claim 23 or 24, wherein:

said filter table comprises a plurality of entries, each of said entries comprising: an address of a particular one of said servers other than said first server, and a range of client machine addresses which are authorized to access said particular one; and said computer-readable program code means for checking further comprises:
computer-readable program code means for extracting a client address from said connect request; and
computer-readable program code means for locating a particular entry in said table, wherein said address in said particular entry matches said extracted client address.

* * * * *